United States Patent [19]

Locatelli et al.

[11] 4,302,572
[45] Nov. 24, 1981

[54] POLYISOCYANATOIMIDO COMPOSITIONS AND IMIDE GROUP CONTAINING POLYMERS PREPARED THEREFROM

[75] Inventors: Jean-Louis Locatelli, Vienne; Jean Robin, Lyons, both of France

[73] Assignee: Rhone-Poulenc Industries, Paris, France

[21] Appl. No.: 112,932

[22] Filed: Jan. 17, 1980

Related U.S. Application Data

[62] Division of Ser. No. 865,210, Dec. 28, 1977, abandoned.

[30] Foreign Application Priority Data

Dec. 31, 1976 [FR] France .................. 76 39874

[51] Int. Cl.³ .................................. C08G 18/02
[52] U.S. Cl. ........................ 528/73; 260/18 TN; 525/440; 525/454; 528/59; 528/68; 528/75; 528/322
[58] Field of Search ............ 528/73, 59, 68, 75, 528/322, 417, 422; 525/440; 210/18 TN

[56] References Cited

U.S. PATENT DOCUMENTS 4,085,164 4/1978 Gruffaz et al. .................. 528/322

OTHER PUBLICATIONS

Condensed Chemical Dictionary, Ninth Edition, p. 721.
Organic Chemistry, Richter, vol. 1 (1919), p. 24.

*Primary Examiner*—Harold D. Anderson
*Attorney, Agent, or Firm*—Burns, Doane, Swecker & Mathis

[57] ABSTRACT

A coating or molding composition including a polyisocyanate, an unsaturated imide and an olefinically unsaturated comonomer copolymerizable with the unsaturated imide, and having a ratio of total isocyanate functions to total polymerizable double bonds in the imide in the range of from 0.3 to 15, is addition polymerized to hard, imide group containing polymers characterized by the recurring unit:

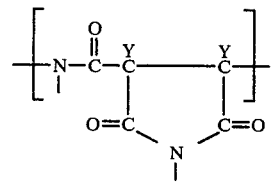

Coatings and shaped articles formed from such polymers are hard, tough, thermally stable, solvent resistant and are good insulators.

15 Claims, No Drawings

POLYISOCYANATOIMIDO COMPOSITIONS AND IMIDE GROUP CONTAINING POLYMERS PREPARED THEREFROM

This is a division, of application Ser. No. 865,210, filed Dec. 28, 1977 now abandoned.

BACKGROUND OF THE INVENTION

1. Field of the Invention

The present invention relates to novel imide group containing polymers, compositions for the preparation thereof, and uses therefor.

2. Summary of the Invention

The novel polymers according to the invention are characterized by the fact that same are prepared by reaction between or among:

(A) A compound comprising an isocyanate functional group selected from the group consisting of polyisocyanates, and mixtures of polyisocyanates and monoisocyanates; and (B) One or more imides selected from the group consisting of:

(i) Monoimides of the formula:

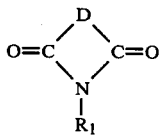 [I]

wherein D represents

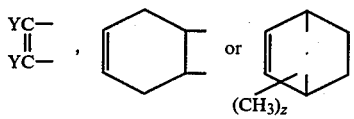

in which Y is H, $CH_3$ or Cl, and Z is either 0, 1 or 2, and $R_1$ represents a hydrogen atom or a monovalent aliphatic, cycloaliphatic or aromatic hydrocarbon radical containing up to 20 carbon atoms; and (ii) Polyimides of the formula:

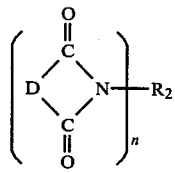 [II]

wherein D is as above, n is an number ranging from 2 to 5 and $R_2$ is a radical having the valence n, such radical being either wholly hydrocarbon or including heteroatom(s), which heteroatom(s) may either comprise a component heterocyclic moiety or may serve as a mere bridge or linkage in said radical i.e., such $R_2$ radical being selected from the group consisting of a wholly hydrocarbon radical, a heteroatom interrupted hydrocarbon radical, a heterocycle radical, and a heterocycle containing hydrocarbon radical, with the reagents (A) and (B) being utilized in quantities such that, if $n_1$ designates the number of NCO groups provided by the compound bearing the isocyanate groups and $n_2$ designates the number of double bonds supplied by the imide, the ratio $r = n_1/n_2$ is between 0.3 and 15.

DETAILED DESCRIPTION OF THE INVENTION

It is intended herein that the term polyisocyanate designate all compounds containing at least two NCO groups. Therefore, both a low molecular weight polyisocyanate (polyisocyanate monomer) or a macropolyisocyanate (polyisocyanate prepolymer) may be used. The polyisocyanate monomers are represented by the following formula:

$$R_3(NCO)_m \qquad [III]$$

in which m is an number of from 2 to 5 and, preferably, either 2 or 3, $R_3$ represents a radical with the valence m and is an aliphatic, cycloaliphatic or aromatic radical having up to 50 carbon atoms. The $R_3$ radical, more particularly, can be a straight or branched chain aliphatic radical having up to 12 carbon atoms, advantageously an alkylene radical, a cycloaliphatic radical having 5 to 6 ring carbon atoms, a monocyclic aromatic radical, desirably having from 6 to 10 carbons, e.g., phenylene or naphthalene, a

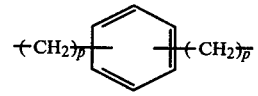

radical where p=1, 2 or 3, a polycyclic aromatic radical as defined above, the individual rings of which may either be condensed or joined by a simple valence bond, or linked by an atom or group such as —O—, —S—, —$SO_2$— or by alkylene radical containing 1 to 4 carbon atoms, and wherein the various aromatic nuclei may be substituted with one or more halogen atoms, or with one or more alkyl radicals having 1 to 4 carbon atoms, or with a methoxy group.

As specific examples of the monomeric polyisocyanates of Formula III, the following are noted as representative:

Toluene-2,4-diisocyanate;
Mixtures of toluene-2,4-diisocyanate and toluene-2,6-diisocyanate;
Bis(4-isocyanatophenyl) methane;
Paraphenylene diisocyanate;
Metaphenylene diisocyanate;
1,5-diisocyanatonaphtalene
Tris(4-isocyanatophenyl) methane;
2,4-Diisocyanato-chlorobenzene;
Bis(4-isocyanatophenyl) ether;
1,6-Diisocyanatohexane;
3-3'-Dimethyl-4,4'-diisocyanato-biphenyl;
Bis(4-isocyanatocyclohexyl) methane;
Bis(3-methyl-4-isocyanatophenyl) methane;
Bis(4-isocyanatophenyl) propane;
4,4'-Diisocyanato-3,3'-dichloro-diphenyl; and
Polyisocyanates of the formula:

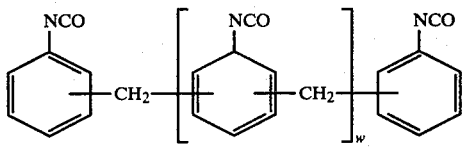

where w is a number ranging from 0.1 to 4.

The polyisocyanate can also be a polyisocyanate prepolymer which can be represented by the formula:

in which the nucleus $\left[\Sigma\right]_q$ designates a polymer chain and the symbol q the number of repeating units constituting the polymer chain, having a value such that the molecular weight of the polyisocyanate of Formula IV can range up to 12,000.

The prepolymer of Formula IV may specifically be a macrodiisocyanate of the formulae:

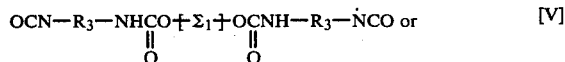

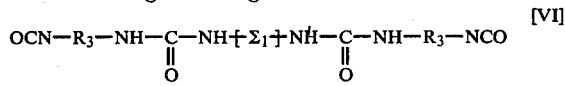

resulting from the reaction of a molar excess of a diisocyanate of the formula $OCN-R_3-NCO$ with a polymer containing at least two reactive hydroxyl or amino groups. The dihydroxylated polymer may be of a varied nature. Thus, as is now well known, it may consist of hydroxylated polybutadiene, castor oil, hydroxylated epoxy resins. It may also consist, and this embodiment represents a type of preferred polymer according to the invention, of a polyester or a polyether. The polyester is typically prepared from a dicarboxylic acid and a diol, using an amount of the reagents such that the OH/COOH ratio is greater than 1 and preferentially between 1.1 and 2.

As examples of dicarboxylic acids, the following are mentioned as being preferred: aliphatic acids such as succinic, glutaric, adipic, pimelic, suberic, azelaic, sebacic, maleic, fumaric, methyliminodiacetic, and dimethyl-amino-3-hexanedioic, the cycloalkane dicarboxylic acids, such as cyclohexane-1,4-dicarboxylic acid, 3-dimethylaminocyclopentane-1,2-dicarboxylic acid, the aromatic diacids, such as the phthalic acids and naphthalene-1,5-dicarboxylic acid, the pyrimidine dicarboxylic acids or imidazole dicarboxylic acid.

Exemplary of the diols, there are mentioned: 1,2-ethanediol, the 1,2 and 1,3 propanediols, the 1,2-, 2,3-, 1,3- and 1,4-butanediols, 1,5-pentanediol, 1,6-hexanediol, 1,10-decanediol, 2,2-dimethyl-1,3-propanediol, 2,2-diethyl-1,3-propanediol, butanediol, butynediol, ethyldiethanolamine. The $\alpha,\omega$-hydroxylated polyethers, such as the poly(oxyalkylene) glycols, noted hereunder as examples of the polyethers, may also be used.

Specifically referring to the conditions under which the diacid/diol condensation may take place, the work *Polyesters* (Pergamon Press, 1965) by Korshak & Vinogradova, is incorporated by reference.

The $\alpha,\omega$-dihydroxylated polyether may be selected from among the poly(oxyalkylene) glycols, such as the poly(oxyethylene) glycols, the poly(oxypropylene) glycols, copolymers with poly(oxyethylene)-poly(oxypropylene) blocks, the poly(oxytetramethylene) glycols obtained by the polymerization of terahydrofuran, the poly(oxybutadiene) glycols obtained from 1,2-epoxy and/or 2,3-epoxy butane, copolymers with poly(oxyethylene)-poly(oxybutylene) and possibly poly(oxypropylene) blocks. Similarly, polyethers containing nitrogen, prepared from ethylene oxide, propylene oxide and/or butylene oxide and a nitrogen compound such as ethylenediamine, benzene sulfonamide, N-methyldiethanolamine, amino-2 ethylethanolamine, may also be used as polyethers.

Naturally, the polyisocyanate may be prepared from a mixture of more than one $\alpha,\omega$-hydroxylated polymers, which may be of similar or different chemical nature.

Also, as indicated above, an $\alpha,\omega$-diamine polymer may be used in place of the $\alpha,\omega$-hydroxylated polymer. Such polymers may be obtained, for example, by the reaction of a dicarboxylic diacid such as those mentioned above, with a molar excess of diamine.

The diamines themselves may be aliphatic, such as, for example, ethylenediamine, hexamethylenediamine, cycloaliphatic, such as, for example, 1,4-diaminocyclohexane, or aromatic, such as for example, paraphenylendiamine, bis(4-aminophenyl)methane, bis(4-aminophenyl)ether, paraxylylenediamine. Moreover, polybutadiene or polyisoprene bearing pendant $NH_2$ groups or, as aforesaid, macrodiamines obtained by the reaction of an excess of diamine with an epoxy resin may also be used as the amine polymer. Such macrodiamines are described, for example, in French Pat. No. 2,259,860 [corresponding to U.S. Pat. No. 3,978,152]. A polyamide-imide having an NCO terminal group, obtained either by the direct reaction of a molar excess of diisocyanate with trimellitic anhydride, or by the reaction of a diisocyanate with a polyamide-imide having a terminal $NH_2$ prepared by the reaction of trimellitic anhydride with a molar excess of diamine, may also be used. It is apparent from the immediately aforesaid that other types of polymers which react with isocyanates may be used, for examples, the polyesteramides themselves well known to the art.

To prepare the polyisocyanate prepolymer from a hydroxyl or amine polymer, the reagents (diisocyanate and polymer) are used in amounts such that the ratio of the number of NCO groups/number of OH or $NH_2$ groups is greater than 1, preferably between 1.1 and 10. Naturally, a mixture of diisocyanates may be used.

For the sake of simplicity only, the preparation of the polyisocyanate prepolymer has been above described solely from difunctional reagents. It is nonetheless apparent, by using a hydroxyl polymer containing more than two hydroxyl groups, for example, by utilizing a polyol in the recipe, to prepare a polyisocyanate prepolymer containing more than two NCO groups per mole (on the average). As examples of such polyols, trimethylol propane, pentaerythritol, saccharose, sorbitol, are mentioned.

The conditions of the reaction between the diisocyanate and the hydroxyl polymer are described, for example, in *Polyurethane Chemistry and Technology* of J. H. Saunders & K. C. Frisch, Part I, 1962.

As heretofore indicated, the invention also contemplates use of a polyisocyanate or a mixture of polyisocyanates, or a mixture of such products with one or more monoisocyanates.

Such monoisocyanates are represented by the formula

G—NCO    [VII]

wherein the symbol G is a saturated or unsaturated, linear or branched chain aliphatic radical, having up to 8 carbon atoms, typically an alkyl radical, a cycloalkyl radical with 5 or 6 carbon atoms, a phenyl radical, an alkylphenyl or phenyl alkyl radical with up to 12 carbon atoms; the various radicals, moreover, may be substituted by one or two chlorine atoms or a methoxy group. Exemplary of such isocyanates of Formula VII, isopropylisocyanate, n-propylisocyanate, tertiobutylisocyanate, propenylisocyanate, chlorophenylisocyanate, dichlorophenylisocyanate, benzylisocyanate, cyclohexylisocyanate, p-methoxyphenylisocyanate, are mentioned.

If a monoisocyanate indeed be used, the quantity of NCO groups supplied by such single function compound should not represent, preferably, more than 30% of the total number of NCO groups supplied by the mono+polyisocyanate mixture.

The second essential component in the preparation of the polymers according to the invention is a compound with an imide group. This compound may be a monoimide (I), a polyimide containing up to 5 imide groups (II), or a mixture of the compounds I and II.

In Formula I, the symbol $R_1$, if it does not represent hydrogen, may specifically represent a linear or branched chain alkyl or alkenyl radical containing up to 20 carbon atoms, a cycloalkyl radical containing 5 or 6 carbon atoms in the ring, a mono- or bicyclic aryl radical or aralkyl radical containing up to 20 carbon atoms, one of the radicals:

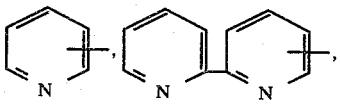

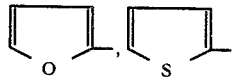

a monovalent radical consisting of a phenyl radical and at least one phenylene radical joined together by a simple valence bond or by an atom or an inert linking group such as: —O—, —S—, an alkylene radical with 1 to 3 carbon atoms, —CO—, —SO$_2$—, —NR$_4$—, —N=N—, —CONH—, —COO—, where $R_4$ represents H, CH$_3$, phenyl or cyclohexyl. In addition, these different radicals may be substituted by one or more atoms, radicals or groups, such as F, Cl, CH$_3$, OCH$_3$, OC$_2$H$_5$, OH, NO$_2$, —COOH, —NHCOCH$_3$, and

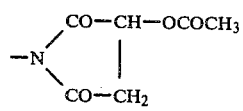

As specific examples of monoimides of Formula I, there are mentioned maleimide, N-phenylmaleimide, N-methylphenylmaleimide, N-phenylchloromaleimide, N-p-chlorophenylmaleimide, N-p-methoxyphenylmaleimide, N-p-methylphenylmaleimide, N-p-nitrophenylmaleimide, N-p-phenoxyphenylmaleimide, N-p-phenylcarbonylphenylmaleimide, maleimido-1-acetoxysuccinimido-4 benzene, maleimido-4-acetoxysuccinimido-4'-diphenylmethane, maleimido-4-acetoxysuccinimido-4'diphenylether, maleimido-4-acetamido-4'-diphenylether, maleimido-2-acetamido-6-pyridine, maleimido-4-acetamido-4'-diphenylmethane, N-methylmaleimide, N-ethylmaleimide, N-vinylmaleimide, N-allylmaleimide, N-cyclohexylmaleimide, N-decylmaleimide.

These monoimides can be prepared by the methods described, for example, in U.S. Pat. Nos. 2,444,536 and 3,717,615 or the German patent application (DOS) No. 2,354,654 [corresponding to U.S. Pat. No. 3,875,113].

In Formula II, the symbol $R_2$ may specifically represent a divalent radical selected from among the following:

An alkylene radical, linear or branched, containing up to 13 carbon atoms;
A cyclohexylene or cyclopentylene radical;
A phenylene or naphtylene radical;
One of the following radicals;

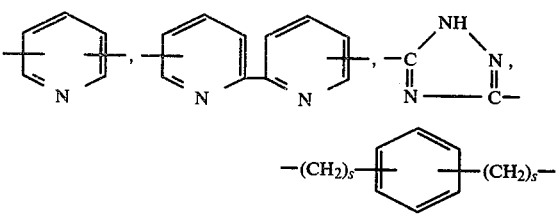

where s is equal to 1, 2 or 3;

A radical containing two phenylene or cyclohexylene radicals joined to each other by a simple valence bond or by a linking atom or inert group, such as —O—, —S—, an alkylene group having 1 to 3 carbon atoms, —CO—, —SO$_2$—, —NR$_5$—, —N=N—, —CONH—, —COO—, —P(O)R$_5$, —CONH—X—NHCO—,

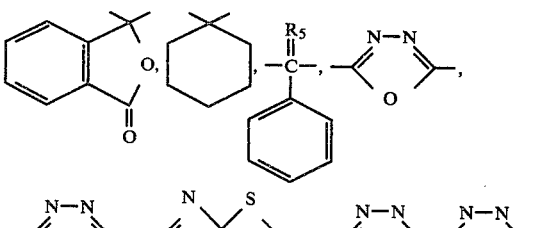

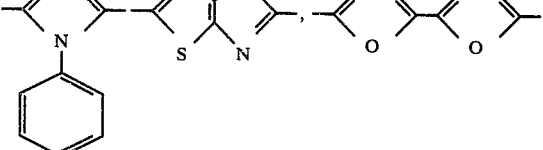

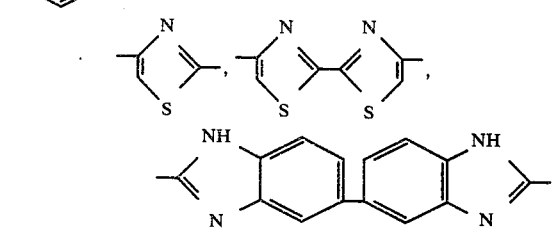

where $R_5$ represents a hydrogen atom, an alkyl radical having 1 to 4 carbon atoms, phenyl or cyclohexyl and X represents an alkylene radical having up to 13 carbon atoms.

As specific examples of such bis-imides the following may be cited:

N,N'-Ethylene-bis-maleimide;
N,N'-Metaphenylene-bis-maleimide;
N,N'-hexamethylene-bis-maleimide;
N,N'-Paraphenylene-bis-maleimide;
N,N'-4,4'-Biphenylene-bis-maleimide;
N,N'-4,4'-Diphenylmethane-bis-maleimide;
N,N'-4,4'-Diphenylmethane-bis-tetrahydrophthalimide;
N,N'-4,4'-Diphenylether-bis-maleimide;
N,N'-4,4'-Diphenylthio-bis-maleimide;
N,N'-4,4'-Diphenylsulfone-bis-maleimide;
N,N'-4,4'-Dicyclohexylmethane-bis-maleimide;
N,N'-α,α'-4,4'-Dimethylene cyclohexane-bis-maleimide;
N,N'-Paraxylylene-bis-maleimide;
N,N'-4,4'-Diphenyl-1,1-cyclohexane-bis-maleimide;
N,N'-4,4'-Diphenylmethane-bis-citraconimide;
N,N'-4,4'-Diphenylether-bis-endomethylene tetrahydrophthalimide;
N,N'-4,4'-Diphenylmethane-bis-chloromaleimide;
N,N'-4,4'-Diphenyl-1,1-propane-bis-maleimide;
N,N'-4,4'-Triphenyl-1,1,1-ethane-bis-maleimide;
N,N'-4,4'-Triphenylmethane-bis-maleimide;
N,N'-3,5-Triazole-1,2,4-bis-maleimide;
N,N'-Dodecamethylene-bis-maleimide;
N,N'-Trimethyl-2,2,4-hexamethylene-bis-maleimide;
Bis(maleimido-2-ethoxy)-1,2-ethane;
Bis(maleimido-3-propoxy)-1,3-propane;
N,N'-4,4'-Benzophenone-bis-maleimide;
N,N'-Pyridinediyl-2,6-bis-maleimide;
N,N'-Naphthylene-1,5-bis-maleimide;
N,N'-Cyclohexylene-1,4-bis-maleimide;
N,N'-Methyl-5-phenylene-1,3-bis-maleimide;
N,N'-Methoxy-5-phenylene-1,3-bis-maleimide.

These bis-imides may be prepared by the methods described in U.S. Pat. No. 3,018,290 and British Patent Specification No. 1,137,592.

The symbol $R_2$ represents a radical containing up to 50 carbon atoms and carrying 3 to 5 free valences, and wherein said radical may comprise a naphthalenic, pyridinic or triazinic nucleus, or a benzene nucleus that may be substituted by one to three methyl groups, or by a plurality of benzene nuclei joined together by a linking atom or an inert group which may be one of those indicated above, or

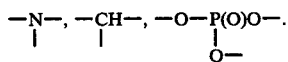

As examples of polyimides of this type, products with the following formulae are noted:

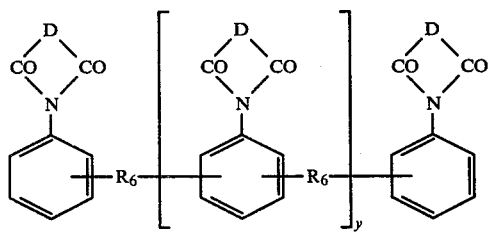

in which D is as above, y is a number from 0.1 to 4, and $R_6$ is a divalent hydrocarbon radical having 1 to 8 carbon atoms, derived from an aldehyde or a ketone having the general formula:

$$O=R_6$$

in which the oxygen atom is bonded to a carbon atom of the radical $R_6$.

As hereinbefore mentioned, the ratio $$r = \frac{\text{number of NCO groups supplied by the polyisocyanate}}{\text{number of double bonds supplied by the imide}},$$

is between 0.3 and 15.

The choice of a given definite value between these aforesaid extreme limits of r indicates to those skilled in the art, on one hand, the nature of the reactants involved, particularly their functionality and, on the other hand, the degree of reticulation desired for the polymers resulting from the reaction. The value of the ratio r is preferably from 0.5 to 10.

The reaction between the polyisocyanate (A) and the imide (B) consists essentially of the addition of the NCO group to one of the sites of carbon-to-carbon unsaturation in the imide, resulting in the formation of the group:

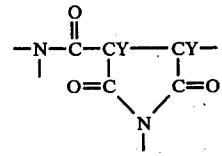

The reaction typically is conducted in the presence of an isocyanate polymerization catalyst. Exemplary of such catalysts, desirably the tertiary amines, are tris-dimethylaminomethyl-2,4,6-phenol, benzyl-2-pyridine, N-methyl-morpholine, triethylamine, bis(dimethylamino)-1,3-butane, N,N'-diethylcyclohexylamine, the carboxylates, for example, potassium, sodium or calcium acetate, sodium naphthenate, and the alkoxides, for example, sodium or potassium methoxide or butoxide, and the phenates. The use of the above and other catalysts is well known to the chemistry of the isocyanates, and reference is again made to the work of Saunders, supra, pp. 94 et seq.

The amount of catalyst typically comprises from 0.01 to 10% of the total weight of the (A)+(B) mixture.

In another embodiment, it has also been found that, in place of the foregoing catalysts, or alternatively in conjunction therewith, excellent results may be obtained by performing the subject reaction in the presence of a vinyl pyridine, optionally substituted, for example, 2-vinyl or 4-vinylpyridine, or 5-methyl-2-vinylpyridine.

If a vinylpyridine be employed, it has also been found that it is possible to very greatly exceed the amounts indicated above for the catalyst. Practically, it is possible to use up to 30% by weight of vinylpyridine with respect to the total weight of the (A)+(B) composition.

All of the foregoing outlines the essential elements necessary to obtain polymers within the ambit of the invention. As a general rule, one merely formulates any composition containing these elements, i.e., the polyisocyanate, the imide, and the catalyst. The composition is generally formulated in the form of a homogeneous solution with a viscosity of the order of 1 to 100 poises at a temperature between 30° and 100° C. In this form, since the reaction has not yet taken place, the viscosity of the composition increases very slowly and the user has sufficient time to carefully apply the composition, for example, as a molding resin, impregnating varnish, coating or adhesive composition for metals, films, particularly polyester films, plastics, and the like.

In order to extend the storage stability or shelf life of the composition (pot-life) even longer, additives known for this purpose logically may be added, in particular, the polymerization inhibitors such as chlorinated solvents, tetrachlorobenzoquinone, for example, in quantities up to 5% of the composition (by weight).

Excessively rapid reactions may also be prevented by using polyisocyanates with all or part of the NCO groups blocked; the use of such blocking agents too is well known to the art and by way of illustration the following compounds are mentioned as representative blocking agents: phenolic compounds (phenol, cresol, xylol, hydroxybenzoic acid), the lactams ($\epsilon$-caprolactam, $\gamma$-butyrolactam), the $\beta$-dicarbonyls (diethyl or dimethylmalonate, ethylacetoacetyl), the amides (acrylamide, acetamide), carbonates, imines, mercaptans, oximes, and the like. The blocking reaction may take place in the presence of an organostannic compound.

The use of blocking agents is well known in the chemistry of isocyanates and reference is made, for example, to the article by Zeno Wicks entitled "Blocked Isocyanates", published in *Progress in Organic Coatings*, 1975, pp. 73–99.

The temperature of the reaction between the polyisocyanate and the imide depends on the nature of the reagents involved, the optional presence of polymerization inhibitors, the potential presence of blocked isocyanates, and the nature and the amount of the catalyst. As a general rule, the reaction is initiated by heating to a temperature equal at least to 100° C., a temperature between 120° and 250° C. typically being employed.

As indicated above, the compositions comprising the polyisocyanate, the imide and the catalyst, may be utilized as such as molding resins, varnishes, and the like. In order to modify certain characteristics of the resin or of the finished product, it is possible to incorporate in the subject compositions comonomers susceptible either to copolymerization with the imides (B) or condensation with the isocyanates (A).

Comonomers capable of copolymerization with the imides are, for example, olefinically unsaturated monomers of the maleic, vinyl, acrylic, allylic types. Exemplary of such monomers, there are noted N-vinyl-pyrrolidone, acrylamide, diallyl phthalate, styrene, triallyl isocyanurate, triallyl cyanurate; comonomers that are reactive with respect to isocyanates are, for example, hydroxyl compounds, such as the polyols or epoxy resins.

The reaction of an isocyanate with an epoxy resin is itself known and such a resin may be selected from among conventional epoxy resins which contain, per molecule, at least two 1,2-epoxy groups. These resins may be prepared by reaction of epichlorohydrin with polyols, such as glycerol, trimethylolpropane, butanediol, pentaerythritol. Glycidyl phenol ethers, such as bis(4-hydroxyphenyl)-2,2-propane, bis(4-hydroxyphenyl)methane, resorcinol, hydroquinone, pyrocatechol, phloroglucinol, 4,4'-dihydroxydiphenyl and condensation products of the phenol/aldehyde type, may also be used. Products of the reaction of epichlorohydrin with primary or secondary amines, such as bis (4-aminomethylphenyl)methane or bis(4-aminophenyl)-sulfone; also the aliphatic or alicyclic polyepoxides resulting from epoxidation by means of the peracids or hydroperoxides of corresponding unsaturated parent compounds, too may be utilized.

The amount of the moderator or comonomer as defined above may vary within broad limits, with the proviso, however, that the ratio r (previously defined) remains within the limits indicated. It is readily understood that if one, for example, employed a large amount of polyisocyanates (r=15), a portion of the NCO groups may be "consumed" by employing a polyol, provided that a sufficient number of NCO groups remains, so that the ratio r is at least 0.3. The same proviso applies, with the necessary changes, to the comonomers susceptible to copolymerization with the unsaturated imide.

As above indicated, compositions consisting of a simple mixture of the several components can be used per se as molding resins, varnishes, etc. The reaction takes place under those temperature conditions previously defined, in the mold, for example, or on a coating, impregnation, or adhesive support.

It is advantageous to bake the resultant shaped articles, for example, at temperatures between 180° and 300° C., to obtain articles, adhesively bonded joints or coatings which are highly resistant to temperature and solvents. Thus, polyester films coated with these polymers can withstand very long periods of exposure without damage at temperatures between 155° and 185° C.

It is possible, from polymers according to the invention and films, in particular polyester films, to produce materials which consist of a polyester film coated on each face with a layer of subject polymer. It is also possible to produce multilayer materials or laminates, specifically complex films consisting alternately of a layer of a polymer according to the invention, polyester film, polymer layer, polyester film, polymer layer. Such film combinations, to which the presence of polymer layers according to the invention (including the layer between the two polyester films) lend a remarkable thermal stability, combine such thermal stability with other desirable properties, in particular mechanical properties, required for certain application. Varnished articles, adhesives, articles or composite films produced from polymers according to the invention thus constitute materials of choice in such industries as the electric and electronic industries, and the aeronautical and aerospace industries; also for plate insulation, and the coating or winding of electrical conductors. The composite films described above are especially well adapted for the protection of electrical conductors in the design of electric motors: the films may be used for insulating the motor slots, the bottom of the motor slot and its closure.

In order to further illustrate the present invention and the advantages thereof, the following specific examples are given, it being understood that the same are intended only as illustrative and in nowise limitative.

EXAMPLE 1

In a reactor equipped with an agitator and heated to 120°, 25 g of N,N'-4,4'-diphenylmethanebismaleimide were dissolved in 65 g of a polyisocyanate composed of 57% by weight of diphenylmethane-4,4'-diisocyanate, 25% by weight of triphenyl dimethylene triisocyanate and 18% by weight of tetraphenyl trimethylene tetraisocyanate. (Polyisocyanate titer of 0.728 NCO/100 g).

The solution was subsequently degassed and 10 g 4-vinylpyridine was added thereto.

This liquid resin which had a viscosity of 2 poises at 75° was poured into a rectangular mold preheated to 150° C. The assembly was maintained for 4 h at 150° C., then at 200° C. for 24 hours.

The resulting molded shaped article displayed the properties described in Table I.

EXAMPLE 2

The experiment of Example 1 was repeated, but using the polyisocyanate, the bismaleimide and the 4-vinylpyridine in the proportions of 75/20/5 by weight. The viscosity of the resin was 2 poises at 65° C.

The properties of the resulting molded shaped article are compiled in Table I.

EXAMPLE 3

Example 1 was repeated, but using the polycyanate, the bismaleimide and the 4-vinylpyridine in the proportions of 50/40/10 by weight. The viscosity of the resin was 10 poises at 95° C.

The properties of the resulting molded cast article are compiled in Table I.

TABLE I

| PROPERTIES | EXAMPLE 1 | EXAMPLE 2 | EXAMPLE 3 |
|---|---|---|---|
| Rf at 25° C. kg/mm$^2$ | 12.6 | 12.3 | 12.5 |
| Rf at 200° C. kg/mm$^2$ | 7.4 | 6.5 | 8.5 |
| Mf at 25° C. kg/mm$^2$ | 280 | 291 | 288 |
| Mf at 200° C. kg/mm$^2$ | 254 | 214 | 255 |
| Rc in j/cm$^3$ | 0.54 | 0.50 | 0.70 |

Rf: Bending strength at rupture (ASTM Standard D 790.63)
Mf: Bending modulus at rupture (ASTM Standard D 790.63)
Rc: Impact strength (Izod impact test/unnotched/on microspecimen, N.F. PT 51.017).

EXAMPLE 4

At 120° C., under agitation, 35 g N,N'-4,4'-diphenylmethane bismaleimide was dissolved in 65 g polyisocyanate, as described in Example 1.

The temperature was then lowered to 70° C. and 2 g 2,4,6-tris(dimethylaminomethyl)phenol were added.

The solution was degassed and poured into a parallelepiped mold preheated to 150° C. The assembly was maintained for 5 h at 150° C. then at 200° C. for 20 h.

The molded shaped article had a bending strength at rupture at 25° C. of 13.8 kg/mm$^2$.

EXAMPLE 5

Example was repeated, but replacing the bismaleimide with N-phenylmaleimide.

The bending strength at rupture at 25° C. of the molded object was 14.1 kg/mm$^2$.

EXAMPLE 6

Example 4 was repeated, but employing a polyisocyanate/bismaleimido ratio of 75/25.

Bending strength at rupture at 25° C. of the molded object was 10.3.

EXAMPLE 7

At 120° C., under stirring, 30 g N,N'-4,4'-diphenylmethane bismaleimide were dissolved in 50 g of a polyisocyanate prepolymer obtained by the reaction of 4,4'-diisocyanate diphenylmethane with a butanediol polyadipate (40 mole%) and ethylene glycol (60 mole %) of molecular weight 2000, with a NCO/OH=5. (The prepolymer titer was 0.228 NCO/100 g and had a viscosity of 1400 poises at 25° C.)

Thereafter, 20 g of the polyisocyanate described in Example 1 were added, followed by cooling to 80° C., prior to addition of 10 g 4-vinylpyridine.

The viscosity of the solution was 80 poises at 70° C.

With the aid of a ladle heated to and maintained at 70° C., a polyester film (polyterephthalate of ethylene glycol) having a thickness of 175μ, was coated with the liquid resin prepared as above. After 3 mn in a furnace at 175° C., the coating was hardened and displayed good flexibility and adherence to the film support.

Elongation was 125% and tensile strength 17.5 kg/mm$^2$ (coated film).

EXAMPLE 8

Example 7 was repeated, but 10 g N-vinyl-2-pyrrolidone were added. The viscosity of the resin was 60 poises at 60° C.

The polyester film was coated under the conditions described in Example 7, resulting in a transparent, homogeneous, flexible coating with good adherence to the film support.

EXAMPLE 9

A solution was prepared by dissolving at 120° C., 30 g N,N'-4,4'-diphenylmethane-bismaleimide in 50 g of the prepolymer described in Example 7 and 10 g of the polyisocyanate described in Example 1.

Subsequently, 20 g m-cresol were added as a blocking agent for the isocyanates, and the solution was agitated for 1 h prior to introducing 10 g N-vinyl-2-pyrrolidone and 0.25 g of the catalyst used in Example 4.

The resin was placed in a temperature controlled vessel at 70° C. (viscosity was 10 poises at this temperature); a polyester film was passed through the vessel, which was then dried between two cylindrical rolls upon emerging from the vessel, and before being passed into a furnace maintained at 160° C.

The coating deposited on the polyester film of 175μ thickness, was 15μ thick on each face surface, transparent, had a yellow tint, and was homogeneous, flexible and adherent to the polyester support.

Specimens of the coated film were subjected to aging at 185° and 200° C. Clear improvement in resistance to elevated temperatures of the polyester film was observed, as shown by the results set forth below (the control film received no coating of any kind).

TABLE 2

| Duration of aging treatment in hours | | Initial values | | 100 h | | 250 h | | 500 h | | 700 h | | 900 h | |
|---|---|---|---|---|---|---|---|---|---|---|---|---|---|
| | | A % | R | A % | R | A % | R | A % | R | A % | R | A % | R |
| at 185° C. | control film | 126 | 17.3 | 22.5 | 11.6 | 0.8 | 2.2 | 0.2 | 0.5 | 0 | | 0 | |
| | coated film | 122 | 17.3 | | | 11 | 15 | 3 | 10.5 | 2.3 | 8.3 | 1.9 | 7 |
| at 200° C. | control film | 126 | 17.3 | 1 | 3.5 | 0.5 | 1.4 | 0 | 0 | | | | |

TABLE 2-continued

| Duration of aging treatment in hours | Initial values | | 100 h | | 250 h | | 500 h | | 700 h | | 900 h | |
|---|---|---|---|---|---|---|---|---|---|---|---|---|
| | A % | R | A % | R | A % | R | A % | R | A % | R | A % | R |
| coated film | 122 | 17.3 | 12.4 | 11.8 | 3.3 | 10.5 | 2.5 | 9.7 | 2 | 7.9 | 1.8 | 6.7 |

A: Elongation in %
R: Tensile strength at rupture at 25° in kg/mm$^2$

EXAMPLE 10

A mixture was prepared at 80° C. under agitation, of 50 g of the prepolymer described in Example 7, 20 g toluene diisocyanate and 50 g m-cresol, in the presence of 1 g tin dibutyldilaurate. After 1 h at 80° C., 8 g butanediol-1,4, 2 g dimethylolpropane, and 30 g 4,4'-bis-maleimidodiphenylmethane were added and the mixture homogenized at 100° C. until the bismaleimide was completely dissolved.

The liquid resin was then cooled to 70° C. (viscosity then was 35 poises) and 1 g of a solution of 30% potassium acetate in diethylene glycol and 1 g of tin dibutyldilaurate were introduced.

From this resin, a film was prepared by depositing a thin layer thereof on a glass plate and hardening same at 180° C. for 5 mn. The film obtained had good flexibility, and was inert to solvents such as xylene, carbon tetrachloride, dimethylformamide, dichloro-1,1-trifluoro-1,1,1-ethane (Freon 113)/100 h in the solvent at 25° C., except for the Freon: 4° C./.

EXAMPLE 11

The preceding example was repeated, but employing 40 g caprolactam in place of the m-cresol. At 70° C. the viscosity of the resin was 70 poises.

The film obtained had characteristics identical to those of the film prepared in said preceding example.

EXAMPLE 12

Example 10 was repeated, but using as the blocking agent (replacing m-cresol) acrylamide and dimethylmalonate.

These products were used in stoichiometric quantities with respect to the polyisocyanate. The viscosity of the resin at 70° C. was, respectively: 100 poises with the acrylamide, 2 poises with the dimethylmalonate.

EXAMPLE 13

Example 10 was repeated, but using as the macrodiisocyanate prepolymer a polyoxypropylene with NCO terminal groups, having a viscosity of 148 poises at 25° C., and with a titer 0.240 NCO per 100 g.

The isocyanate used to prepare the macrodiisocyanate was bis(4-isocyanatophenyl)methane.

The film obtained by deposition on a glass plate was highly flexible.

EXAMPLE 14

The resin prepared in Example 11 was deposited in a thin layer on a polyimide film (polypyromellitimide of diaminodiphenylether).

Hardening took place at 200° C. for 5 mn, and very good adherence of the coating to the polyimide film was observed.

EXAMPLE 15

Into a reactor placed into a 70° C., 300 g 4,4'-diisocyanatodiphenylmethane, 200 g caprolactam and 1 g tin dibutyldilaurate were introduced. The mixture was heated to 100° C. with agitation in 1 h, then 500 g 4,4'-bismaleimido-diphenylmethane were added. The temperature was increased to 140° C. until the bismaleimide was completely dissolved, then 10 cm$^3$ of a solution of 30% potassium acetate in diethylene glycol were added.

The resin was then cooled on a pan to ambient temperature, and thence ground.

The powder obtained softens around 80° C. and was used to coat aluminum plates preheated to 200° C., simply by sprinkling the powder with the aid of a sieve.

The fused resin was immediately distributed. Following baking at 200° C. for 8 h, it was found that the coating adhered firmly to the support and did not exhibit cracking or swelling.

EXAMPLE 16

This example illustrates the preparation of a composite film comprising: a layer of the polymer/polyester film/polymer layer/polyester film/polymer layer.

The polymer was prepared as follows:

A mixture was made, at 80° C., under agitation, of:
60 g of the polyisocyanate prepolymer used in Example 7;
20 g toluene diisocyanate;
40 g ϵ-caprolactam; and
0.11 g tin dibutyldilaurate.

The mixture was maintained at 80° C. under agitation for 1 h, then 30 g N,N'4,4'-diphenylmethane bismaleimide were introduced, and the temperature next raised to 130° C. Following the dissolution of the bismaleimide, 14 g butanediol-1,4 and 2 g trimethylolpropane were introduced in the reactor, the temperature lowered to 85° C. and 0.16 g tin dibutyldilaurate, 1.6 g of a solution of potassium acetate (0.48 g) in diethylene glycol, were added.

The resin obtained had a viscosity of approximately 30 poises at 80° C.

This resin was placed into an impregnating vat with double walls, controlled at a temperature of 90°–95° C. with circulating oil; the heating of the resin produced a viscosity of approximately 5 poises.

Two polyester films (ethylene glycol polyterephthalate) were used, the thickness of each was 125μ.

The two polyester films (hereafter Film A and Film B) were coated as follows: the two films, A and B, were treated with a flow discharge (using the machine, "Effluveur LEPEL", Model HF SG2) in order to raise the surface tension to approximately 60 dynes/cm, rid of static electricity (using a Deselectriseur Regma, Model WD 120) and cleaned of dust (by aspiration).

The films were then conveyed through the bath containing the resin, on separate rolls, to permit the coating of each film on both faces and thence superimposed; subsequently, the composite assembly was passed through heated cylindrical bars. The gap between the bars controlled the total thickness of the composite film. The gap used in this example was 270μ. The composite film was then conveyed to and through a furnace heated to 150° C., remaining in the furnace for 7 mn.

Using the resin described above and following the mode of operation set forth, a composite film comprising the two polyester films and the various layers of resin was prepared, the total thickness of the composite film being approximately 300μ, the thickness of the resin layers being approximately 10–15μ for the external layers and approximately 20–30μ for the internal layers.

While the invention has been described and illustrated with reference to certain preferred embodiments thereof, those skilled in the art will appreciate that various changes, modifications and substitutions therein can be made without departing from the spirit of the invention. It is intended, therefore, that the invention be limited only by the scope of the claims which follow.

What is claimed is:

1. A composition of matter comprising (A) at least one organic polyisocyanate, (B) at least one unsaturated imide selected from the group consisting of:

(i) a monoimide of the formula:

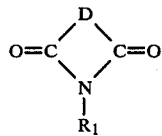

wherein D represents

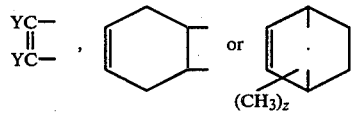

in which Y is H, CH$_3$ or Cl, and Z is either 0, 1 or 2, and R$_1$ is hydrogen or a monovalent aliphatic, cycloaliphatic or aromatic hydrocarbon radical containing up to 20 carbon atoms; and (ii) a polyimide of the formula:

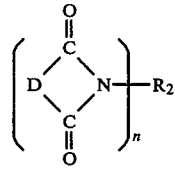

wherein D is as above, n is a number ranging from 2 to 5 and R$_2$ is a radical having the valence n, such R$_2$ radical being selected from the group consisting of a wholly hydrocarbon radical, a heteroatom interrupted hydrocarbon radical, a heterocycle radical and a heterocycle containing hydrocarbon radical and wherein said composition the ratio r of total isocyanate functions in the polyisocyanate (A) to total polymerizable double bonds in the unsaturated imide (B) is in the range of from 0.3 to 15, and (C) an additional comonomer which is an olefinically unsaturated comonomer copolymerizable with the unsaturated imide (B).

2. An imido polymer, comprising the polyaddition product of the composition of matter as defined by claim 1.

3. The composition of matter as defined by claim 1, wherein the polyisocyanate is a monomeric polyisocyanate of the formula:

$$R_3-NCO)_m \quad \text{[III]}$$

in which m is a number of from 2 to 5, and R$_3$ represents a radical with the valence m and is an aliphatic, cycloaliphatic or aromatic radical having up to 50 carbon atoms, said R$_3$ radical being selected from the group consisting of a wholly hydrocarbon radical, a heteroatom interrupted hydrocarbon radical, a heterocycle radical, and a heterocycle containing hydrocarbon radical.

4. The composition of matter as defined in claim 3, wherein the number m is either 2 or 3.

5. The composition of matter as defined by claim 3, wherein R$_3$ is a straight or branched chain aliphatic radical having up to 12 carbon atoms, a C$_1$–C$_{12}$ alkylene radical, a cycloaliphatic radical having 5 to 6 ring carbon atoms, a monocyclic or fused bicyclic aromatic radical, a

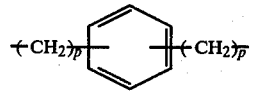

radical where p is 1, 2 or 3, a polycyclic aromatic radical as defined above, the individual rings or which being either fused or linked by a simple valence bond, or linked by an atom or bridge selected from the group consisting of —O—, —S—, —SO$_2$— or an alkylene radical containing 1 to 4 carbon atoms, or further wherein the various aromatic nuclei are substituted with one or more halogen atoms, or with one or more alkyl radicals having 1 to 4 carbon atoms, or with a methoxy group.

6. The composition of matter as defined by claim 3, wherein the polyisocyanate is selected from the group consisting of toluene-2,4-diisocyanate, mixtures of toluene-2,4-diisocyanate and toluene-2,6-diisocyanate, bis(4-isocyanatophenyl)methane, paraphenylene diisocyanate, metaphenylene diisocyanate, 1,5-diisocyanatonaphthalene, tris(4-isocyanatophenyl)methane, 2,4-diisocyanato-chlorobenzene, bis(4-isocyanatophenyl)ether, 1,6-diisocyanatohexane, 3,3'-dimethyl-4,4'-diisocyanato-biphenyl, bis(4-isocyanatocyclohexyl)methane, bis(3-methyl-4-isocyanatophenyl)methane, bis(4-isocyanatophenyl)propane, 4,4'-diisocyanato-3,3'-dichloro diphenyl, and polyisocyanates of the formula:

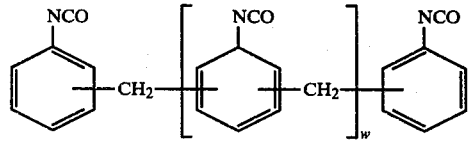

where w is a number ranging from 0.1 to 4.

7. The composition of matter as defined by claim 1, wherein the component (A) further comprises up to 30% of a monoisocyanate of the formula:

$$G-NCO \quad \text{[VII]}$$

wherein the symbol G is a substituted or unsubstituted, saturated or unsaturated, linear or branched chain aliphatic radical, having up to 8 carbon atoms, a C$_1$–C$_8$ alkyl radical, a cycloalkyl radical with 5 or 6 carbon atoms, a phenyl radical, an alkylphenyl or phenylalkyl radical with up to 12 carbon atoms, said substituents being one or two chlorine atoms or a methoxy group.

8. The composition of matter as defined by claim 1, wherein the unsaturated imide has the formula I, and $R_1$ represents a substituted or unsubstituted, linear or branched chain alkyl or alkenyl radical containing up to 20 carbon atoms, a cycloalkyl radical containing 5 or 6 carbon atoms in the ring, a mono- or bicyclic aryl radical or aralkyl radical containing up to 20 carbon atoms,

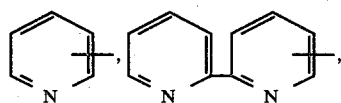

a monovalent radical selected from the group consisting of a phenyl radical and at least one phenylene radical joined together by a simple valence bond or by an atom or an inert bridge selected from the group —O—, —S—, an alkylene radical with 1 to 3 carbon atoms, —CO—, —SO$_2$—, NR$_4$—, —N=N—, —CONH—, —COO—, where $R_4$ represents H, CH$_3$, phenyl or cyclohexyl, said substitutents being selected from the group F, Cl, CH$_3$, OCH$_3$, OC$_2$H$_5$, OH, NO$_2$, —COOH, —NHCOCH$_3$, and

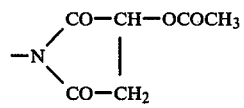

9. The composition of matter as defined by claim 1, wherein the unsaturated imide is selected from the group consisting of maleimide, N-phenylmaleimide, N-methylphenylmaleimide, N-phenylchloromaleimide, N-p-chlorophenylmaleimide, N-p-methoxyphenylmaleimide, N-p-methylphenylmaleimide, N-p-nitrophenylmaleimide, N-p-phenoxyphenylmaleimide, N-p-phenylcarbonylphenylmaleimide, maleimido-1-acetoxysuccinimido-4-benzene, maleimido-4-acetoxysuccinimido-4'-diphenylmethane, maleimido-4-acetoxysuccinimido-4'-diphenylether, maleimido-4-acetamido-4-diphenylether, maleimido-2-acetamido-6 pyridine, maleimido-4-acetamido-4'-diphenylmethane, N-methylmaleimide, N-ethylmaleimide, N-vinylmaleimide, N-allylmaleimide, N-cyclohexylmaleimide, N-decylmaleimide.

10. The composition of matter as defined by claim 1, wherein the unsaturated imide has the formula II, and $R_2$ is an alkylene radical, linear or branched, containing up to 13 carbon atoms; a cyclohexylene or cyclopentylene radical; a phenylene or naphthylene radical;

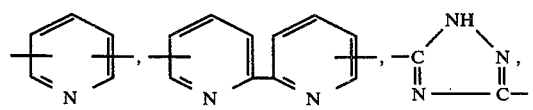

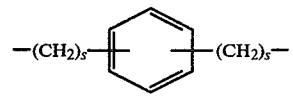

where s is equal to 1, 2 or 3; a radical containing two phenylene or cyclohexylene radicals joined to each other by a simple valence bond or by a linking atom or inert bridge selected from the group consisting of —O—, —S—, an alkylene group having 1 to 3 carbon atoms,

—CO—, —SO$_2$—, —NR$_5$—, —N=N—, —CONH—, —COO—,

—P(O)R$_5$, —CONH—X—NHCO—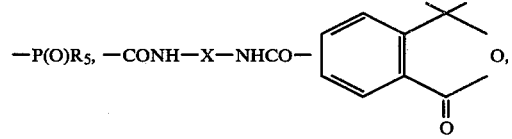

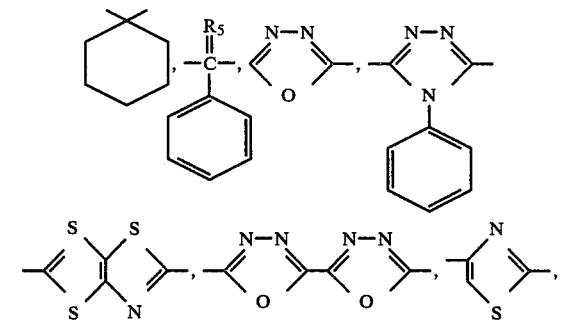

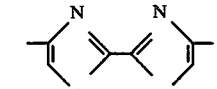

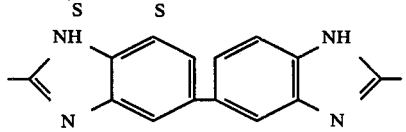

where $R_5$ represents a hydrogen atom, an alkyl radical having 1 to 4 carbon atoms, phenyl or cyclohexyl and X represents an alkylene radical having up to 13 carbon atoms.

11. The composition of matter as defined by claim 1 wherein the unsaturated imide is selected from the group consisting of N,N'-ethylene-bis-maleimide, N,N'-metaphenylene-bis-maleimide, N,N'-hexamethylene-bis-maleimide, N,N'-para-phenylene-bis-maleimide, N,N'-4,4'-biphenylene-bis-maleimide, N,N'-4,4'-diphenylmethane-bis-maleimide, N,N'-4,4'-diphenylmethane-bis-tetrahydrophthalimide, N,N'-4,4'-diphenylether-bis-maleimide, N,N'-4,4'-diphenylthio-bis-maleimide, N,N'-4,4'-diphenylsulfone-bis-maleimide, N,N'-4,4'-dicyclohexylmethane-bis-maleimide, N,N'-,'-4,4'-dimethylene cyclohexane-bis-maleimide, N,N'-paraxylylene-bis-maleimide, N,N'-4,4'-diphenyl-1,1-cyclohexane-bis-maleimide, N,N'-4,4'-diphenylmethane-bis-citraconimide, N,N'-4,4'-diphenylether-bis-endometylene tetrahydrophthalimide, N,N'-4,4'-diphenylmethane-bis-chloro-maleimide, N,N'-4,4'-diphenyl-1,1-propane-bis-maleimide, N,N'-4,4'-triphenyl-1,1,1-ethane-bis-maleimide, N,N'-4,4'-triphenylmethane-bis-maleimide, N,N'-3,5-triazole-1,2,4-bis-maleimide, N,N'-dodecamethylene-bis-maleimide, N,N'- trimethyl-2,2,4-hexymethylene-bis-maleimide, bis(-maleimido-2-ethoxy)-1,2-ethane, bis(maleimido-3-propoxy)-1,3-propane, N,N'-4,4'-benzophenone-bis-maleimide, N,N'-pyridinediyl-2,6-bis-maleimide, N,N'-naphthylene-1,5-bis-maleimide, N,N'-cyclohexylene-1,4-bis-maleimide, N,N'-methyl-5-phenylene-1,3-bis-maleimide, and N,N'-methoxy-5-phenylene-1,3-bis-maleimide.

12. The composition of matter as defined by claim 1, wherein the unsaturated imide has the structural formula:

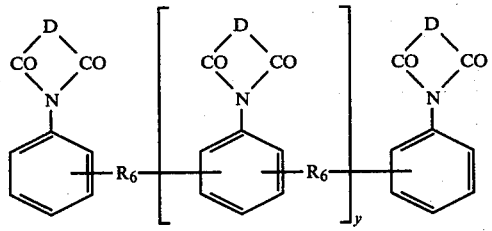

wherein y is number from 0.1 to 4, and $R_6$ is a divalent hydrocarbon radical having 1 to 8 carbon atoms.

13. The composition of matter as defined by claim 1 wherein the ratio r is in the range of from 0.5 to 10.

14. The composition of matter as defined by claim 1, further comprising a catalytic amount of an isocyanate polymerization catalyst.

15. The composition of matter as defined by claim 1, wherein the polyisocyanate is a polyisocyanate prepolymer selected from the group consisting of those of the formulae:

$$OCN-R_3-HNCO-(\Sigma_1)-OCHN-R_3-NCO \quad [V]$$
$$\overset{\|}{O} \qquad \overset{\|}{O}$$

$$OCN-R_3-NH-\overset{\|}{\underset{O}{C}}-NH-(\Sigma_1)-NH-\overset{\|}{\underset{O}{C}}-NH-R_3-NCO \quad [VI]$$

wherein $\Sigma_1$ comprises a divalent organic radical derived from a polymer containing at least two reactive hydroxyl or amino groups, said prepolymer resulting from the reaction of a molar excess of diisocyanate of the formula OCN—$R_3$—NCO with said reactive hydroxyl or amino group-containing polymer.

* * * * *